(12) United States Patent
Jeong et al.

(10) Patent No.: US 9,285,986 B2
(45) Date of Patent: Mar. 15, 2016

(54) METHOD FOR CONTROLLING ICON DISPLAY IN MOBILE TERMINAL AND MOBILE TERMINAL THEREOF

(75) Inventors: Kye Sook Jeong, Seoul (KR); In Young Hwang, Seoul (KR); Mee Yeon Choi, Seoul (KR); Hyun Suk Jung, Seoul (KR); Eun Jeong Ryu, Seoul (KR); Byoung Nam Lee, Seoul (KR); Jung Seok Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1191 days.

(21) Appl. No.: 12/726,293

(22) Filed: Mar. 17, 2010

(65) Prior Publication Data

US 2011/0099524 A1 Apr. 28, 2011

(30) Foreign Application Priority Data

Oct. 27, 2009 (KR) .................. 10-2009-0102321

(51) Int. Cl.
*G06F 3/048* (2013.01)
*G06F 3/14* (2006.01)
*G06F 3/0488* (2013.01)

(52) U.S. Cl.
CPC .. *G06F 3/04886* (2013.01); *G06F 2203/04802* (2013.01)

(58) Field of Classification Search
USPC ......... 715/840, 843, 864, 788, 798, 799, 815, 715/836, 838, 852
See application file for complete search history.

(56) References Cited

U.S. PATENT DOCUMENTS

| | | | | |
|---|---|---|---|---|
| 5,452,414 A | * | 9/1995 | Rosendahl | G06F 3/04815 358/1.18 |
| 7,509,588 B2 | * | 3/2009 | Van Os et al. | 715/864 |
| 2007/0109298 A1 | * | 5/2007 | Elmieh et al. | 345/419 |
| 2009/0178008 A1 | * | 7/2009 | Herz et al. | 715/840 |
| 2010/0185989 A1 | * | 7/2010 | Shiplacoff et al. | 715/856 |
| 2010/0333008 A1 | * | 12/2010 | Taylor | 715/769 |

* cited by examiner

*Primary Examiner* — Stella E Higgs
(74) *Attorney, Agent, or Firm* — Lee, Hong, Degerman, Kang & Waimey

(57) ABSTRACT

The present disclosure relates to a method for controlling an icon display in a mobile terminal and a mobile terminal thereof, wherein the method comprises: generating a plurality of menu screens having a plurality of icons and displaying a first menu screen on a touch screen, the first menu screen being at least one of the plurality of menu screens; additionally displaying a set-up menu screen which is stored in a memory of the mobile terminal, the set-up menu screen including a menu icon; displaying a second menu screen if a flicking signal is generated on the first menu; and displaying an instant icon of a selected menu icon on the second menu icon if the selected menu icon of the set-up menu screen is moved to the second menu screen.

19 Claims, 14 Drawing Sheets

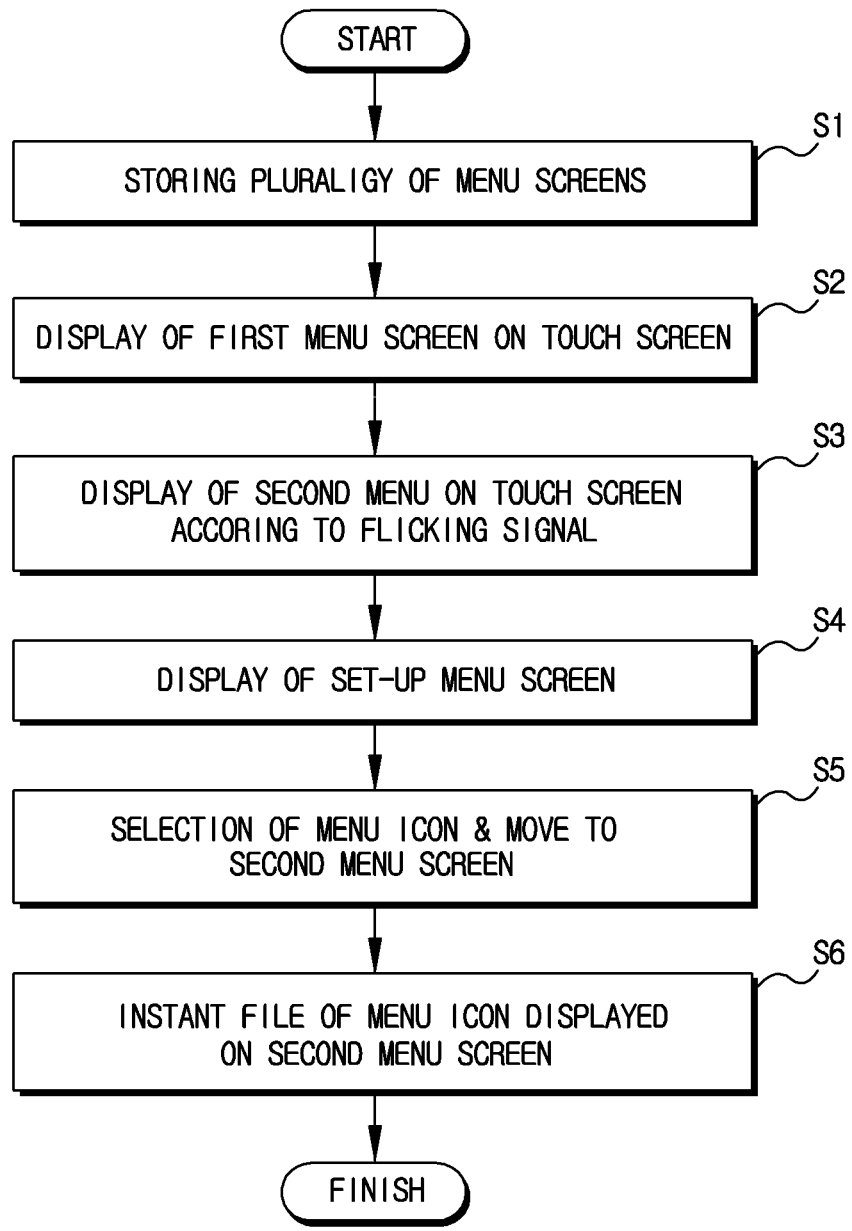

METHOD FOR CONTROLLING ICON DISPLAY IN MOBILE TERMINAL AND MOBILE TERMINAL THEREOF

Pursuant to 35 U.S.C.§119 (a), this application claims the benefit of earlier filing date and right of priority to Korean Patent Application No. 10-2009-0102321, filed on Oct. 27, 2009, the contents of which are hereby incorporated by reference in their entirety.

BACKGROUND OF THE DISCLOSURE

1. Field

The present disclosure relates to a method for controlling an icon display in a mobile terminal having a touch screen and a mobile terminal thereof.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To implement the complex functions in the multimedia player, improvement of structural parts and/or software parts of the terminal may be considered in various attempts. Furthermore, various menus require various demands on user interface for easing selection, execution and deletion of the various menus.

SUMMARY

Objects of the present disclosure are to provide a method for controlling icon display in mobile terminal and a mobile terminal thereof allowing a user to easily delete a desired menu.

In one general aspect of the present disclosure, a method for controlling an icon display in a mobile terminal having a touch screen, the method comprising: generating a plurality of menu screens having a plurality of icons and displaying a first menu screen on the touch screen, the first menu screen being at least one of the plurality of menu screens; additionally displaying a set-up menu screen which is stored in a memory of the mobile terminal, the set-up menu screen including a menu icon; displaying a second menu screen if a flicking signal is generated on the first menu; and displaying an instant icon of a selected menu icon on the second menu icon if the selected menu icon of the set-up menu screen is moved to the second menu screen.

In some exemplary embodiments, the plurality of icons may be plate-shaped 3 dimensional (3-D) icons.

In some exemplary embodiments, the step of displaying a second menu screen if a flicking signal is generated on the first menu may comprise determining the second menu screen based on direction of the flicking signal.

In some exemplary embodiments, the plurality of menu screens is displayed by being divided into at least two 3-D blocks.

In some exemplary embodiments, the method for controlling an icon display in a mobile terminal may further comprise deleting the display of 3-D blocks if a deletion command signal is generated on one of the 3-D blocks by a user.

In some exemplary embodiments, the method for controlling an icon display in a mobile terminal may further comprise rotating the 3-D blocks if a flicking signal is generated on one of the 3-D blocks.

In some exemplary embodiments, the method for controlling an icon display in a mobile terminal may further comprise temporarily displaying the instant icon of the selection menu on the second menu screen if the selected menu icon borders on a borderline between the second menu screen and the set-up menus screen.

In some exemplary embodiments, the method for controlling an icon display in a mobile terminal may further comprise storing the instant icon on the second menu screen.

In another general aspect of the present disclosure, a mobile terminal, comprising: a memory configured to store a set-up menu screen including a menu icon and a plurality of menu screens including a plurality of icons; a touch screen configured to display a first menu screen which is one of the plurality of menu screens; and a controller configured to display a menu screen set up in the memory on the first menu screen and the touch screen, displaying a second menu screen if a flicking signal is generated on the first menu screen and controllably displaying an instant icon of the selected menu icon on the second menu screen if one of the menu icons of the set-up menu screen is selected to move the one of the menu icons to the second menu screen.

In some exemplary embodiments, the plurality of icons may be plate-shaped 3-D icons.

In some exemplary embodiments, the controller may determine the second menu screen based on direction of the flicking signal.

In some exemplary embodiments, the controller may temporarily display the instant icon of the selection menu on the second menu screen if the selected menu icon borders on a borderline between the second menu screen and the set-up menus screen.

In some exemplary embodiments, the controller may control in such a manner that the instant icon is stored in the second menu screen.

In some exemplary embodiments, the menu screen may be discretely displayed by being divided into at least two 3-D blocks.

In some exemplary embodiments, the controller may control the touch screen to allow the display of 3-D blocks to be deleted if a deletion command signal is generated on one of the 3-D blocks by a user.

In some exemplary embodiments, the controller may control the touch screen to allow the 3-D blocks to be rotated if a flicking signal is generated on one of the 3-D blocks.

In still another general aspect of the present disclosure, a mobile terminal, comprising: a memory configured to store a set-up menu screen including a menu icon and a plurality of menu screens including a plurality of icons, where the menu icon is a 3-D icon; a touch screen configured to display a first menu screen which is one of the plurality of menu screens; and a controller configured to display a menu screen set up in the memory on the first menu screen and the touch screen, displaying a second menu screen if a flicking signal is generated on the first menu screen and controllably displaying an instant icon of the selected menu icon on the second menu screen if one of the menu icons of the set-up menu screen is selected to move the one of the menu icons to the second menu screen.

In some exemplary embodiments, the plurality of icons may be plate-shaped 3-D icons.

In some exemplary embodiments, the controller may determine the second menu screen based on direction of the flicking signal.

In some exemplary embodiments, the controller may temporarily display the instant icon of the selection menu on the second menu screen if the selected menu icon borders on a borderline between the second menu screen and the set-up menus screen.

In some exemplary embodiments, the controller may control in such a manner that the instant icon is stored in the second menu screen.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 4 is a flowchart illustrating a method for controlling icon display in mobile terminal according to an exemplary embodiment of the present disclosure;

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals such as stationary terminals that include digital TVs and desktop computers, the details of which are well known to the persons in the art.

Figure 1:
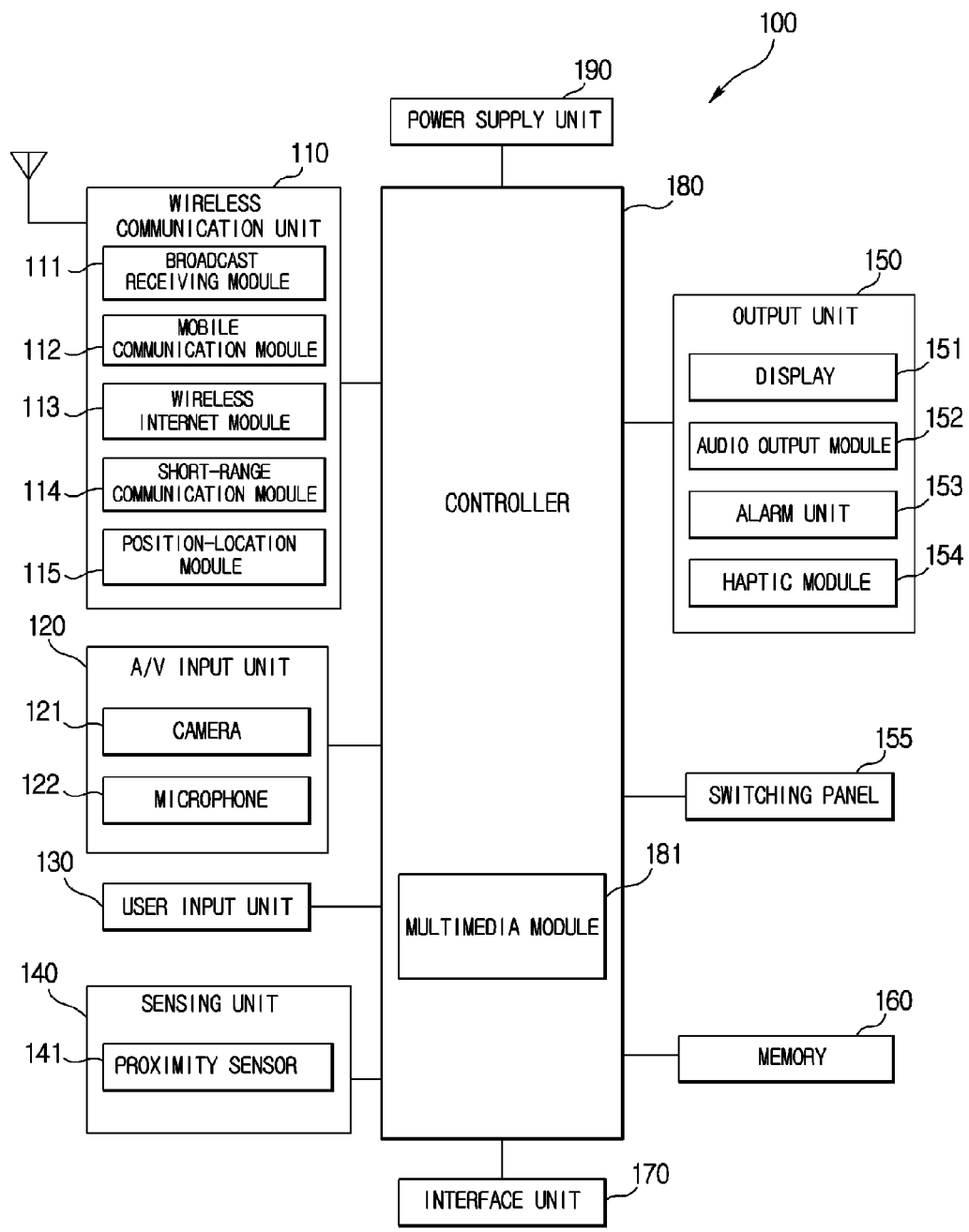
FIG. 1 is a block diagram of a mobile terminal according to an exemplary embodiment of the present disclosure.

FIG. 1 is a block diagram of a mobile terminal according to an exemplary embodiment of the present disclosure. Other embodiments and arrangements may also be provided.

FIG. 1 shows a mobile terminal 100 having various components, although other components may also be used. More or fewer components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (Media-FLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

Referring to FIG. 1, the audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two or more displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereinafter a touch sensor) are constructed in a mutual-layered structure (hereinafter a touch screen), the display 151 may be used as an input device as well as an output device. For example, the touch sensor 142 may include a touch film, a touch sheet, a touchpad and/or the like.

The touch sensor 142 may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor 142, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touch screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touch screen is an electrostatic type, the proximity sensor 141 may detect proximity of a pointer using a variation of an electric field according to the proximity of the pointer. In this case, the touch screen (touch sensor) may be classified into the proximity sensor.

An action in which a pointer approaches the touch screen without contacting the touch screen may be called a proximity touch. An action in which a pointer actually touches the touch screen may be called a contact touch. The location of the touch screen proximity-touched by the pointer may be the position of the pointer that vertically opposes the touch screen when the pointer performs the proximity touch.

The proximity sensor 141 may detect a proximity touch and/or a proximity touch pattern (e.g., a proximity touch distance, proximity touch duration, a proximity touch position, a proximity touch shift state, etc.). Information corresponding to the detected proximity touch action and/or the detected proximity touch pattern may be outputted to the touch screen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touch screen as a character an/or recognizing a picture drawing input performed on the touch screen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
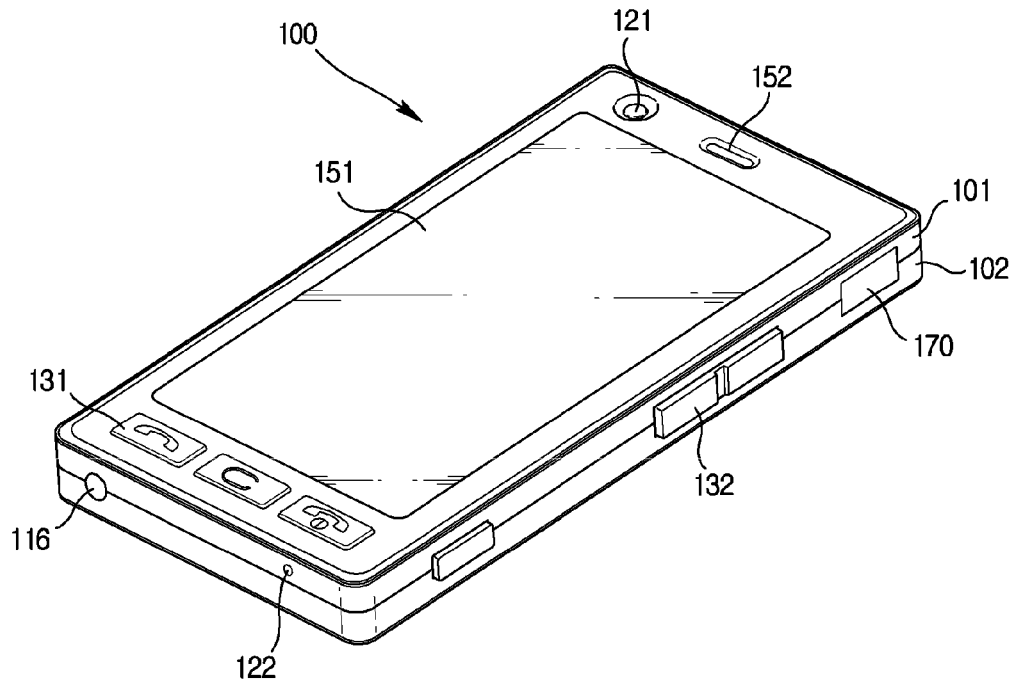
FIG. 2 is a perspective view illustrating according to an exemplary embodiment of the present disclosure.

FIG. 2a is a front-view of a mobile terminal according to an example embodiment. Other embodiments, configurations and arrangements may also be provided.

As shown in FIG. 2a, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
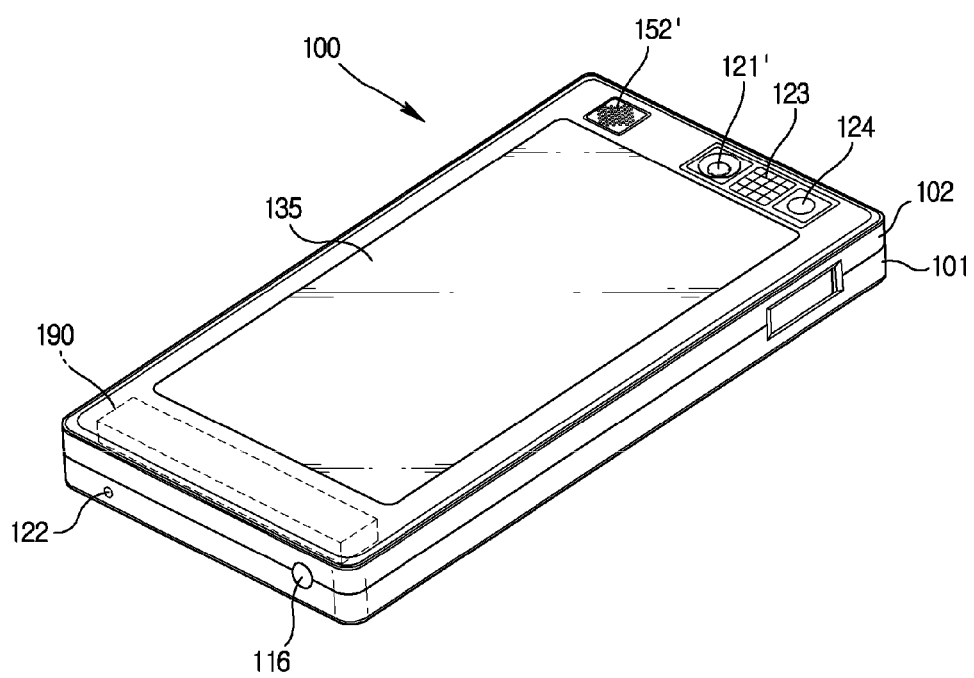

FIG. 2b is a perspective diagram of a backside of the mobile terminal shown in FIG. 2a. Other embodiments, configurations and arrangements may also be provided.

As shown in FIG. 2b, a camera 121' may be additionally provided on a backside of the terminal body, and more particularly on the rear case 102. The camera 121' may have a photographing direction that is substantially opposite to a photographing direction of the camera 121 (shown in FIG. 2a) and may have pixels differing from pixels of the camera 121.

For example, the camera 121 may have a lower number of pixels to capture and transmit a picture of user face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2a also shows a touchpad 135 for detecting a touch that is additionally provided on the rear case 102. The touchpad 135 may be configured in a light transmissive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touch screen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

Now, an interconnecting operation method between the display 151 and the touchpad 135 will be illustrated with reference to FIGS. 3a and 3b.

Figure 3A:
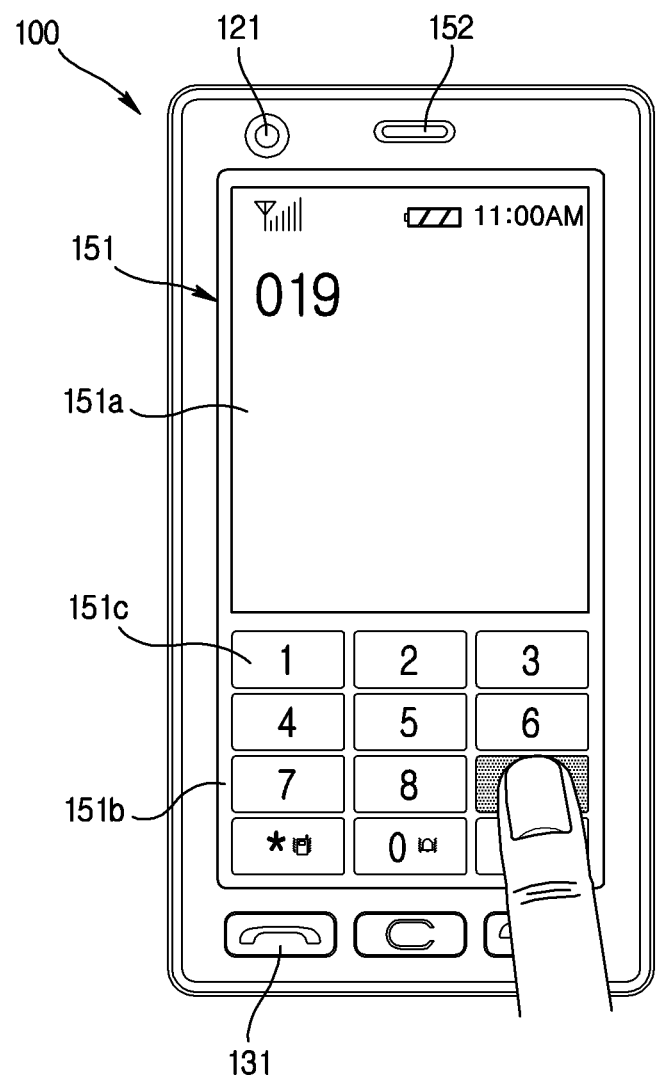
FIGS. 3a and 3b are front views of mobile terminal illustrating an operation status of the mobile terminal according to the present disclosure.
Figure 3B:
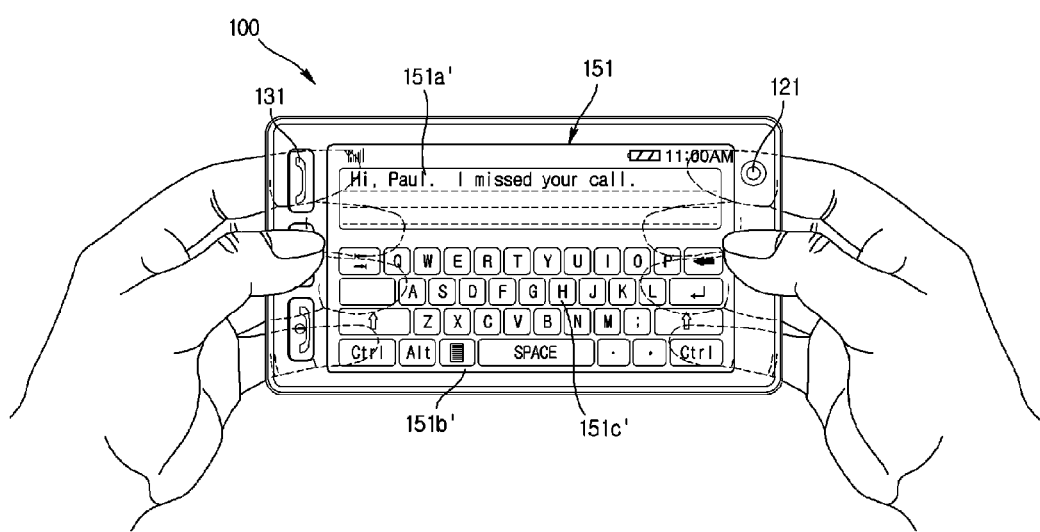

FIGS. 3a and 3b are front views of mobile terminal illustrating an operation status of the mobile terminal according to the present disclosure.

The display 151 may be displayed with various types of visual information, where the information may include texts, numbers, symbols, graphics or icons. In order to input the information, at least of the texts, numbers, symbols, graphics or icons may be displayed in a predetermined arrangement for implementation in the form of a keypad. The keypad is a so-called "soft key".

FIG. 3a illustrates an input of touch applied to a soft key through a front surface of body of the mobile terminal.

The display 151 may be operated on an entire area or operated by being divided into a plurality of areas. In the case of the latter, the plurality of areas may be so configured as to be interconnectedly operated.

For example, an upper area and a lower area of the display 151 may be respectively displayed with an output window 151a and an input window 151b. Each of the output window 151a and the input window 151b is an area respectively allocated for output and input of information. The input window 151b may be displayed with a soft key 151c indicated with numbers for input of telephone numbers and the like.

In a case the soft key 151c is touched, numbers corresponding to the touched soft key may be displayed on the output window 151a. In a case a first manipulating unit 131 is manipulated, a call connection is attempted to a telephone number displayed on the output window 151a.

FIG. 3b illustrates an input of touch applied to a soft key through a rear surface of body of the mobile terminal (terminal body). FIG. 3a illustrates the terminal body arranged in a longitudinal way (portrait) while FIG. 3b illustrates the terminal body (landscape) arranged in a crosswise way. The display 151 may be configured to change an output screen according to arrangement direction of the terminal body.

FIG. 3b illustrates a text input mode being operated in a mobile terminal. The display 151 is displayed with an output window 151a' and an input window 151b'. The input window 151b' may be arranged with a plurality of soft keys 151c' displayed with at least one of a text, a symbol and numbers.

In a case the soft keys 151c' are touched via the touch pad (135. see FIG. 2b), text, numbers and symbol corresponding to the touched soft key are displayed on the output window 151a'. As noted above, there is an advantage in the touch input via the touch pad 135 over the touch input via the display 151 in that the soft key 151c' is not hidden by a finger during touch. In a case the display 151 and the touch pad 135 are transparently formed, fingers positioned at a rear surface of the terminal body can be checked visually, thereby enabling to provide a more accurate touch input.

In addition to the input methods thus disclosed by the exemplary embodiments, the display 151 or the touch pad 135 may be configured to receive the touch via scroll. The user can scroll the display 151 or the touch pad 135 to move a subject displayed on the display 151, e.g., a cursor or a pointer positioned on an icon. Furthermore, in a case a finger is moved on the display 151 or the touch pad 135, a path along which the finger has moved can be visually displayed on the display 151, which may be very useful in editing an image displayed on the display 151.

To cope with a case where the display 151 and the touch pad 135 are simultaneously touched within a predetermined time scope, a function of the terminal may be executed. The case where the display 151 and the touch pad 135 are simultaneously touched within a predetermined time scope may be a case where a thumb and a first finger of the user are used to clamp the terminal body. The one function may be, for example, activation or inactivation of the display 151 or the touch pad 135.

Now, a method for controlling icon display in mobile terminal according to an exemplary embodiment of the present disclosure will be described in detail with reference to FIG. 4.

FIG. 4 is a flowchart illustrating a method for controlling icon display in mobile terminal according to an exemplary embodiment of the present disclosure.

First of all, the memory 160 of the mobile terminal 100 is stored with a plurality of menu screens including plurality of icons (S1). The plurality of icons may be plate-shaped 3-D icons. Furthermore, the menu screen may be wallpaper (background screen).

In a case the user generates a display command signal of first menu screen which is one of menu screens stored in the memory 160, the display 151 which is a touch screen is displayed with a first menu screen (S2). The first menu screen is displayed with at least one icon. The icon may include at least one of an instant file icon, a widget icon, a file icon and a folder icon.

Under this circumstance, in a case the user generates a flicking signal of one direction to the touch screen, a second menu screen is displayed (S3). The controller 180 of the mobile terminal 100 may determine the second menu screen based on the direction of the flicking signal.

Furthermore, the first menu screen may be formed with a plurality of 3-D blocks, where each of the 3-D blocks may be rotated in response to a predetermined control signal, displayed or removed, details of which will be explained with reference to FIG. 7.

Meanwhile, a set-up menu screen may be displayed along with the second menu screen while the second menu screen is displayed on the touch screen 151 (S4). The set-up menu screen is displayed with a menu icon pre-stored in the memory 160.

In a case the user selects one of the menu screens of the set-up menu screen to move the second menu screen (S5), the selected instant icon of the menu icon is displayed on the second menu screen (S6). Therefore, the user can conveniently prepare a desired menu screen.

That is, in a case the user touches and drags the menu icon displayed on the set-up menu screen while determining a desired menu screen using the flicking signal out of the plurality of menu screens, the menu screen is added with the instant icon of the menu icon. The instant icon thus added is stored in the memory 160 automatically or in response to a user storage command. Therefore, the user can conveniently prepare the desired menu screen according to the exemplary embodiment of the present disclosure.

Figure 5:
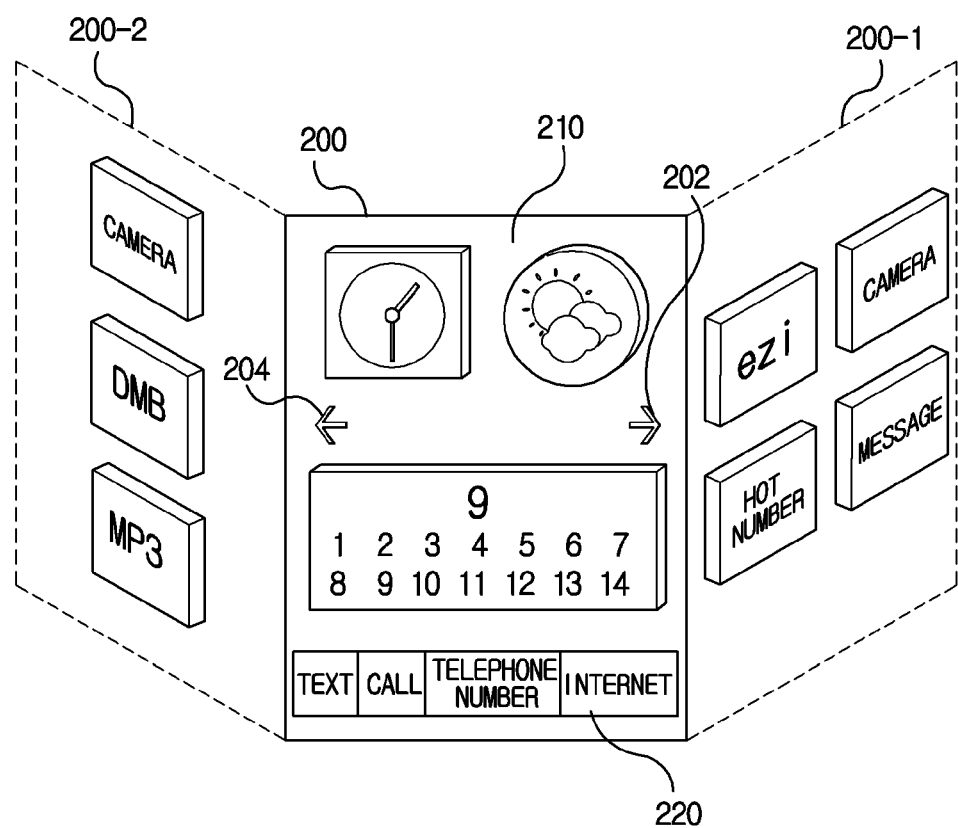
FIG. 5 is an image view illustrating concept of wallpaper (background screen) employed for a method for controlling icon display in mobile terminal according to an exemplary embodiment of the present disclosure.

FIG. 5 is an image view illustrating concept of wallpaper (background screen) employed for a method for controlling icon display in mobile terminal according to an exemplary embodiment of the present disclosure.

FIG. 5 is displayed with a concept view of wallpaper. The display 151 of the mobile terminal 100 is displayed with first wallpaper 200. Furthermore, second wallpaper 200-1 and third wallpaper 200-2 are arranged in an imaginary space across the first wallpaper. That is, the memory 160 is stored with a plurality of wallpaper, and only one of the wallpaper is displayed on the display 151 (i.e., the first wallpaper 200).

As illustrated, the first wallpaper 200 includes a tap area displayed with a display area 210 including a watch widget, a weather widget and a calendar widget, and a tap area displayed with execution icons including a text message icon, a call icon, a telephone number icon, and internet icon.

Under the circumstance, in a case the user generates a wallpaper change signal of one direction (e.g., a right side flicking signal 202, the third wallpaper 200-2 is moved to the display 151 to replace the first wallpaper 200. Conversely, in a case the user generates a wallpaper change signal of the other direction (e.g., a left side flicking signal 204), the second wallpaper 200-1 is moved to the display 151 to replace the first wallpaper 200.

As illustrated, the second wallpaper 200-1 may include an ez-i icon, a camera icon, a hot number icon and a message icon, and the third wallpaper may include a camera icon, a DMB icon and an MP icon. Furthermore, the first, second and third wallpaper are arranged on each surface of 3-D space, such that when the wallpaper is changed, the wallpaper may be changed in the same manner as the user's view is changed to a first surface to a second surface.

According to the wallpaper of the above concept, the user can set up a plurality of wallpaper and easily change the wallpaper in response to the flicking signal.

Now, a method for controlling icon display in mobile terminal according to the present disclosure using an image view of the mobile terminal applied with a method for removing icons will be described.

Figure 6A:
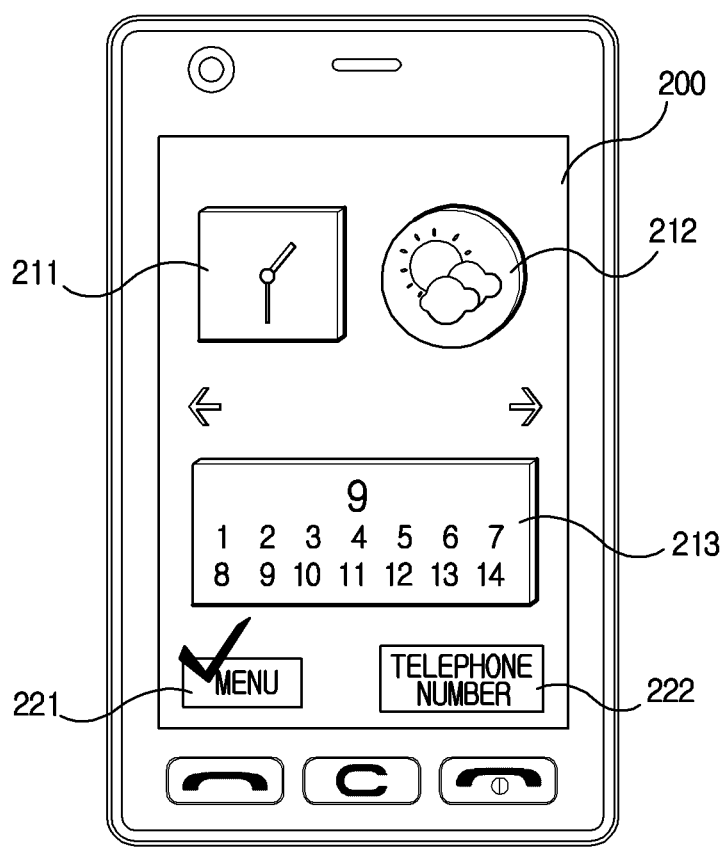
FIG. 6 is an image view illustrating a first example of a mobile terminal in which a method for controlling icon display in mobile terminal according to an exemplary embodiment of the present disclosure.
Figure 6B:
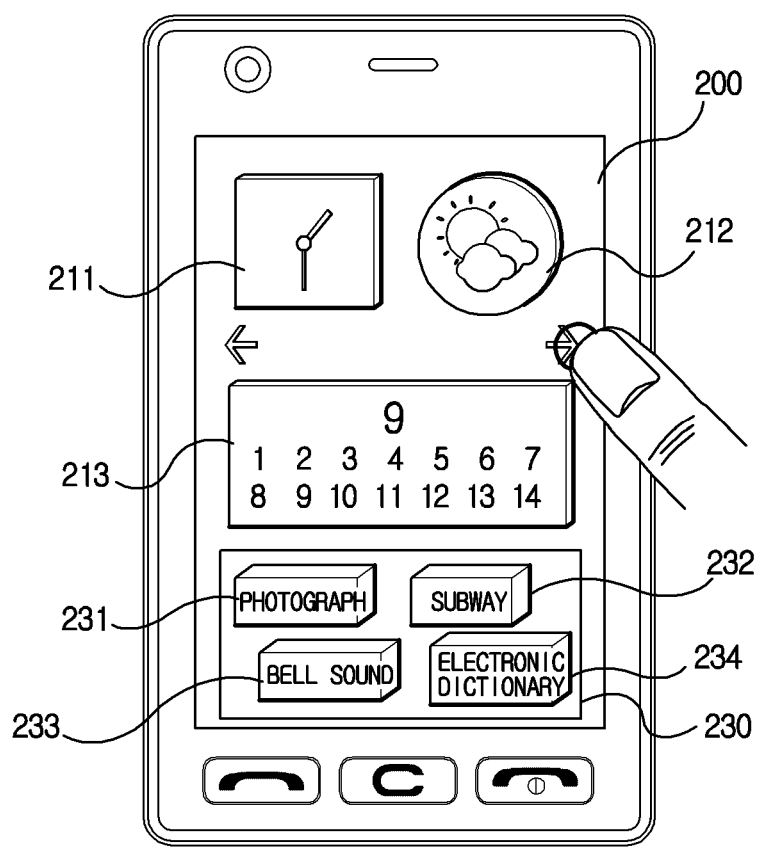
Figure 6C:
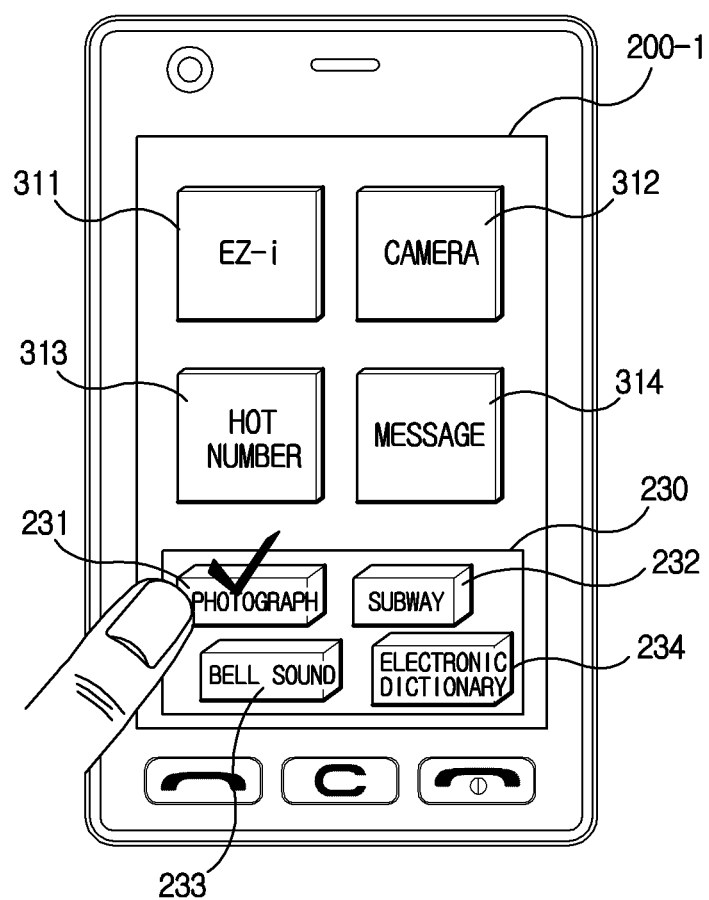
Figure 6D:
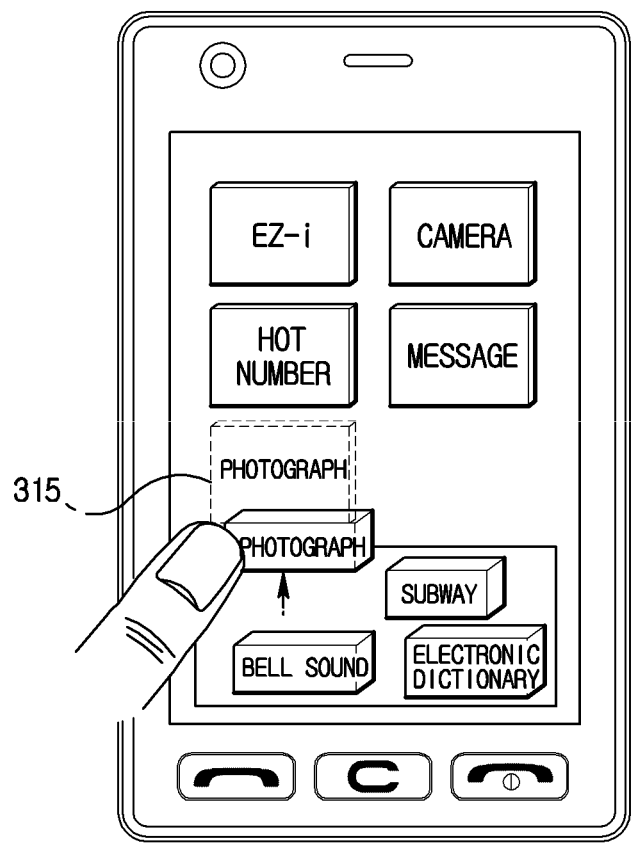
Figure 6E:
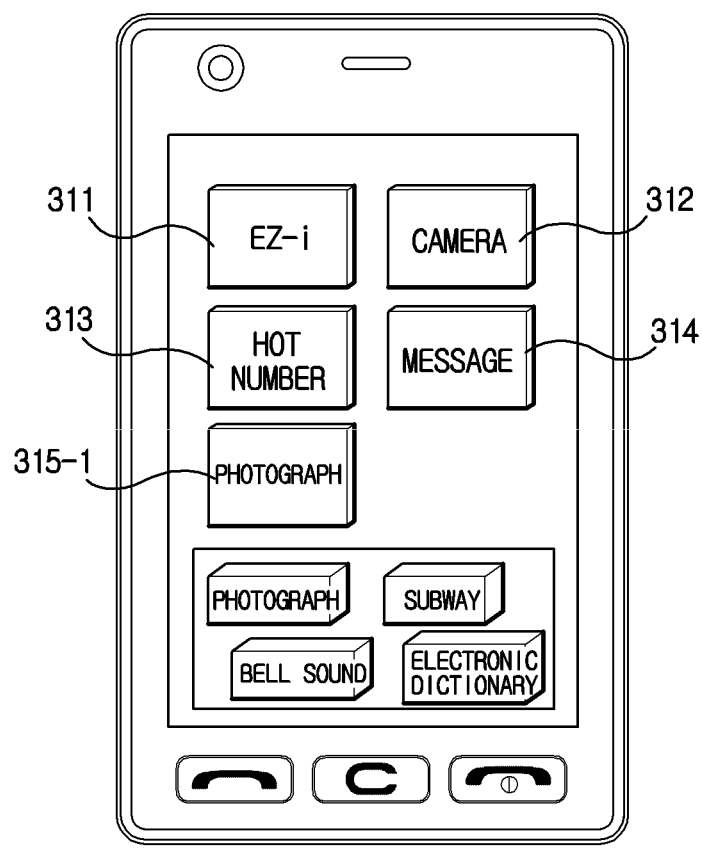
Figure 7A:
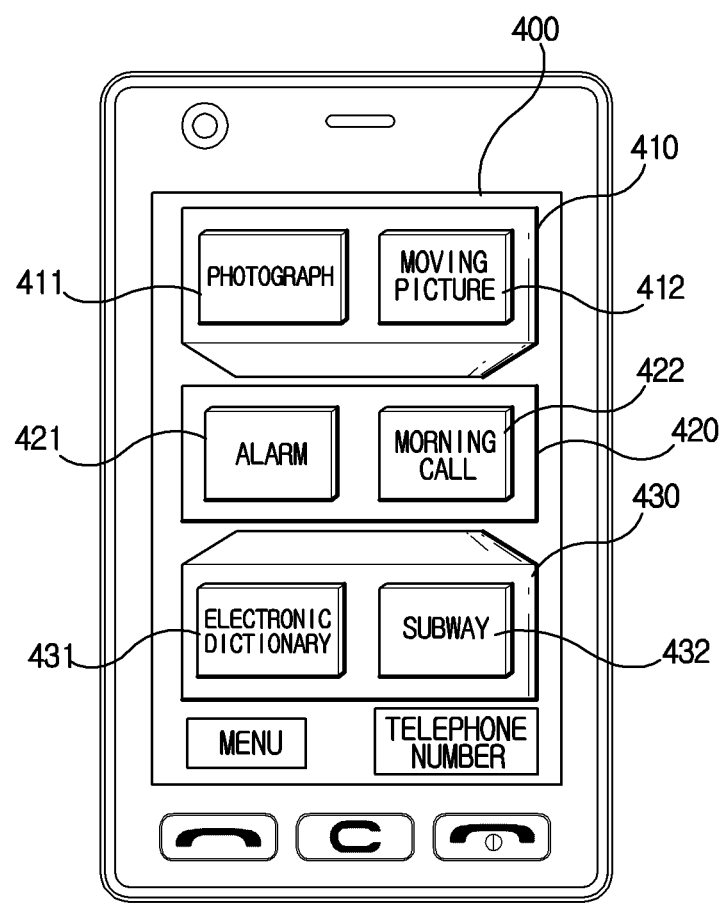
FIG. 7 is an image view illustrating a second example of a mobile terminal in which a method for controlling icon display in mobile terminal according to an exemplary embodiment of the present disclosure.
Figure 7B:
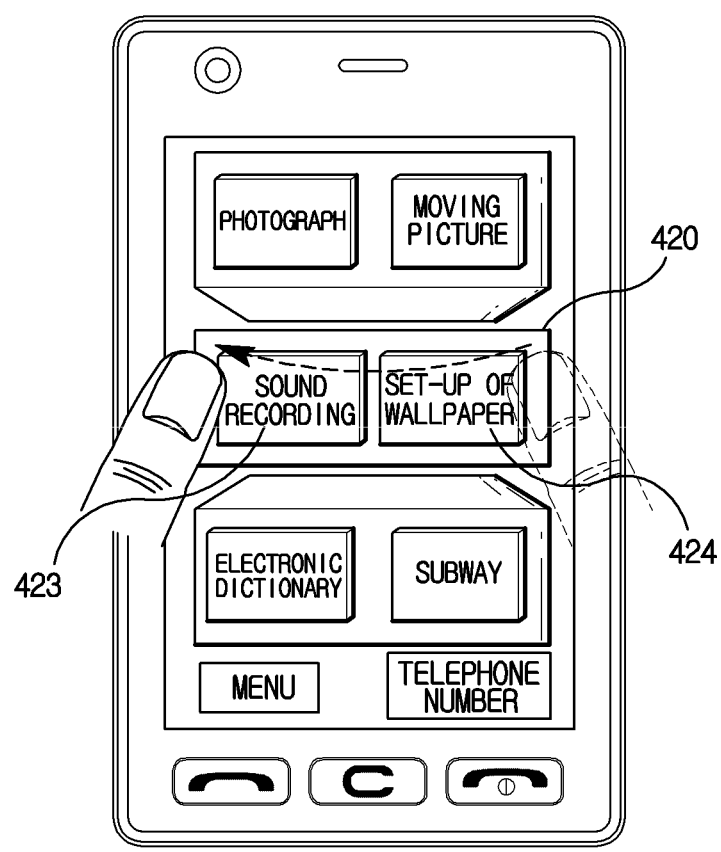

FIG. 6 is an image view illustrating a first implementation of a mobile terminal in which a method for controlling icon display in mobile terminal according to an exemplary embodiment of the present disclosure, and FIG. 7 is an image view illustrating a second implementation of a mobile terminal in which a method for controlling icon display in mobile terminal according to an exemplary embodiment of the present disclosure.

FIGS. 6 and 7 describe exemplary wallpaper. However, it should be apparent that the present disclosure is not limited thereto, but may be applied to the conventional menu screen.

[First Implementation]

FIG. 6 is an image view illustrating a first implementation of a mobile terminal in which a method for controlling icon display in mobile terminal according to an exemplary embodiment of the present disclosure.

FIG. 6a illustrates wallpaper 200. The wallpaper may include a watch widget 211, a weather widget 212, a calendar widget 213, a menu icon 221 and a telephone number icon 222. The watch widget 211, the weather widget 212 and the calendar widget 213 may be displayed in a tile-shaped icon (3-D icon).

Under this circumstance, in a case the user selects the menu icon 221, a menu set-up screen 230 is displayed as illustrated in FIG. 6b. The menu set-up screen 230 may include a photograph menu icon 231, a subway menu screen 232, a bell sound menu icon 233 and an electronic dictionary 234 menu icon.

Under the circumstance, in a case the user generates a flicking signal of one direction (see 204 of FIG. 5) on the wallpaper 200, the wallpaper 200 is replaced by the second wallpaper 200-1, the details of which are already described in FIG. 5, such that there will no further elaboration thereto.

As illustrated in FIG. 6c, the second wallpaper 200-1 may include an ez-i icon 311, a camera icon 312, a hot number icon 313 and a message icon 314. The set-up menu screen 230 stays displayed being unchanged.

Under this circumstance, the user selects one of the menu icons (the photograph menu icon 231 in this case) displayed on the set-up menu screen 230 and moves the selected menu icon to the second wallpaper 200-1 (i.e., the photograph menu icon 231 is moved by touch and drag motion). At this time, in a case the photograph menu icon 231 borders on a borderline between the set-up menu screen 230 and the second wallpaper 200-1, a temporary photograph instant icon 315 is displayed as shown in FIG. 6d.

At this time, in a case the user returns the photograph icon to the set-up menu screen again, the photograph menu icon is not displayed on the second wallpaper (i.e., the instant icon of photograph menu is not generated).

Conversely, in a case the user keeps moving the photograph menu icon 231 toward the second wallpaper 200-1 and takes up the drop motion (i.e., in a case the touched pointing device is removed from the touch screen), the temporary photograph instant icon 315 is fixed at a photograph menu instant icon 315-1 as illustrated in FIG. 6e. According to the aforementioned example, a desired menu icon can be conveniently generated and stored on a plurality of wallpaper.

[Second Implementation]

FIG. 7 is an image view illustrating a second implementation of a mobile terminal in which a method for controlling icon display in mobile terminal according to an exemplary embodiment of the present disclosure.

Referring to FIG. 7a, wallpaper 400 displayed on the touch screen may be discretely displayed in 3-D blocks (410, 420 and 430). The first block 410 is displayed with a photograph menu icon 411 and a moving picture menu icon 412, the second block is displayed with an alarm menu icon 421 and a morning call menu icon 422, and the third block 430 is displayed with an electronic dictionary menu icon 431 and a subway menu icon 432.

Successively, in a case the user selects the second 3-D block 420 to generate a left flicking signal, a display surface of the second 3-D block 420 may be changed to display a sound recording menu icon 423 and a wallpaper set-up menu icon 424. That is, the user may select and rotates each 3-D block (410-430), and prepare a wallpaper of desired menu.

Figure 7C:
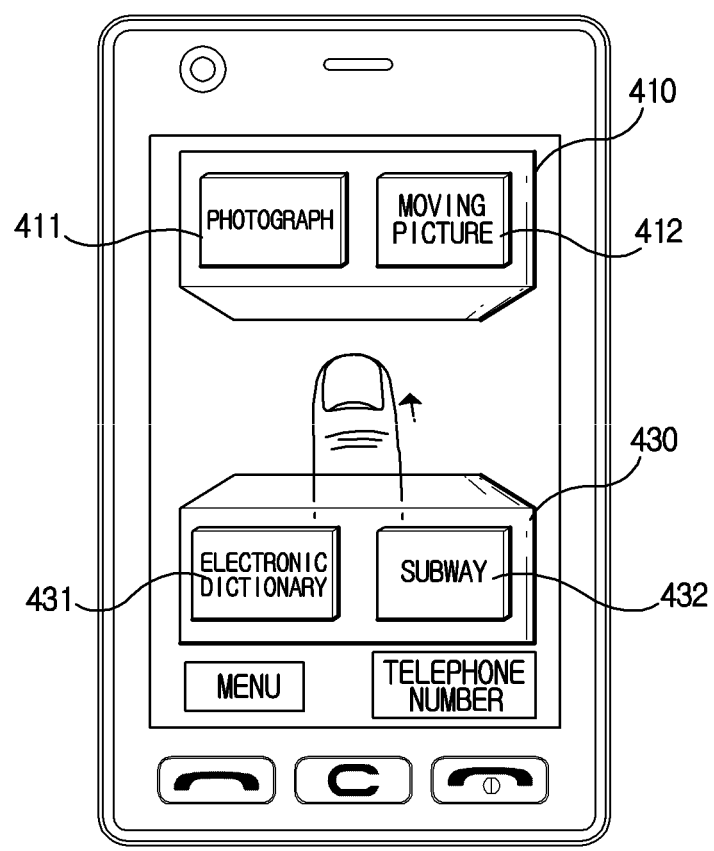

Meantime, the user may remove the display of at least one of the 3-D blocks. That is, in a case a long touch input (not limited thereto) to the second 3-D block is given, the controller 180 of the mobile terminal 100 recognizes the long touch input as display removal command of the second 3-D block 420, removes the display of the second 3-D block 420 as shown in FIG. 7c, and displays only the first and second 3-D blocks on the touch screen 151. According to the aforementioned second example, a desired wallpaper or menu screen can be conveniently prepared using the 3-D blocks. Furthermore, the set-up menu screen used in the first example may be applied to the second example.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Thus, it is intended that embodiments of the present disclosure may cover the modifications and variations of this disclosure provided they come within the scope of the appended claims and their equivalents.

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an icon display in a mobile terminal, the method comprising:
displaying a first screen of a plurality of screens on a touch screen of the mobile terminal, each of the plurality of screens including a plurality of icons;
displaying a set-up menu screen different from the plurality of screens in response to selection of a displayed menu icon, wherein the set-up menu screen is stored in a memory of the mobile terminal and includes at least one application icon;
displaying a second screen of the plurality of screens on the touch screen in response to a first flicking input on the first screen, the second screen is determined based on a direction of the first flicking input, wherein the set-up menu screen stays unchanged while the first screen is changed to the second screen; and
displaying a temporary instant icon indicating an icon drop location corresponding to an application icon of the at least one application icon on at least the second screen or the set-up menu screen when the application icon is moved to the second screen according to a drag input on the application icon, wherein the first screen further includes at least two 3-dimensional (3-D) blocks, each of the 3-D blocks comprising at least two icons, and wherein the method further comprises:

receiving a second flicking input on one of the at least two 3-D blocks;

displaying another at least two in the one of the at least two 3-D blocks on which the second flicking input was received;

receiving a deletion input on one of the at least two 3-D blocks, the deletion input including a long touch input; and removing the one of the at least two 3-D blocks on which the deletion input was received from the second screen.

2. The method of claim 1, wherein the plurality of icons comprises plate-shaped 3 dimensional (3-D) icons.

3. The method of claim 1, further comprising storing the temporary instant icon in the memory of the mobile terminal as corresponding to the second screen.

4. The method of claim 1, wherein the set-up menu screen is displayed in a portion of the first screen.

5. The method of claim 1, wherein the set-up menu screen and the first screen are displayed separately.

6. The method of claim 1, wherein a size of the temporary instant icon is different from a size of the application icon.

7. The method of claim 1, wherein a shape of the temporary instant icon is different from a shape of the application icon.

8. The method of claim 1, wherein the application icon is displayed in the set-up menu screen area after the temporary instant icon corresponding to the application icon is displayed on the second screen.

9. The method of claim 1, further comprising:

removing the temporary instant icon from the second screen when the application icon is returned to the set-up menu screen according to the drag input on the application icon.

10. A mobile terminal comprising:

a memory configured to store a set-up menu screen and a plurality of screens, each of the plurality of screens including a plurality of icons, wherein the set-up menu screen includes at least one application icon and is different from the plurality of screens;

a touch screen configured to display a first screen of the plurality of screens; and a controller configured to:

control the touch screen to display the set-up menu screen in response to a selection of a displayed menu icon;

control the touch screen to display a second screen of the plurality of screens in response to a first flicking input on the first screen, the second screen is determined based on a direction of the first flicking input, wherein the set-up menu screen stays unchanged while the first screen is changed to the second screen;

control the touch screen to display a temporary instant icon indicating an icon drop location corresponding to an application icon of the at least one application icon on at least the second screen or the set-up menu screen when the application icon is moved to the second screen according to a drag input on the application icon;

control the touch screen to display the second screen further including at least two 3-dimensional (3-D) blocks, each of the 3-D blocks comprising at least two icons;

receive a second flicking input on one of the at least two 3-D blocks;

control the touch screen to display another at least two icons in the one of the at least two 3-D blocks on which the second flicking input was received;

receive a deletion input on one of the at least two 3-D blocks, the deletion input including a long touch input; and control the touch screen to remove the one of the at least two 3-D blocks on which the deletion input was received from the second screen.

11. The mobile terminal of claim 10, wherein the plurality of icons comprises plate-shaped 3-D icons.

12. The mobile terminal of claim 10, wherein the controller controls the temporary instant icon to be stored in the memory as corresponding to the second screen.

13. The mobile terminal of claim 10, wherein the application icon comprises a 3-dimensional (3-D) icon.

14. The mobile terminal of claim 10, wherein the set-up menu screen is displayed in a portion of the first screen.

15. The mobile terminal of claim 10, wherein the set-up menu screen and the first screen are displayed separately.

16. The mobile terminal of claim 10, wherein a size of the temporary instant icon is different from a size of the application icon.

17. The mobile terminal of claim 10, wherein a shape of the temporary instant icon is different from a shape of the application icon.

18. The mobile terminal of claim 10, wherein the application icon is displayed in the set-up menu screen after the temporary instant icon corresponding to the application icon is displayed on the second screen.

19. The mobile terminal of claim 10, wherein the controller is further configured to:

control the touch screen to remove the temporary instant icon on the second screen when the application icon is returned to the set-up menu screen according to the drag input on the application icon.

* * * * *